United States Patent
Asuma et al.

(10) Patent No.: US 7,787,089 B2
(45) Date of Patent: Aug. 31, 2010

(54) TRANSPARENT TYPE LIQUID CRYSTAL DISPLAY DEVICE

(75) Inventors: Hiroaki Asuma, Mobara (JP); Kenji Kitajima, Oamishirasato (JP); Takamitsu Kamada, Mobara (JP); Susumu Edo, Mobara (JP); Ryouhei Suzuki, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 12/566,845

(22) Filed: Sep. 25, 2009

(65) Prior Publication Data

US 2010/0079713 A1    Apr. 1, 2010

(30) Foreign Application Priority Data

Sep. 26, 2008   (JP) .............................. 2008-248955

(51) Int. Cl.
*G02F 1/1343*   (2006.01)

(52) U.S. Cl. ........................... 349/139; 349/56; 349/84; 349/140

(58) Field of Classification Search ............ 349/56, 349/84, 139, 140
See application file for complete search history.

(56) References Cited

U.S. PATENT DOCUMENTS

| 6,995,898 B2* | 2/2006 | Otake et al. ................. 359/318 |
| 2004/0021822 A1* | 2/2004 | Yoshizoe ..................... 349/187 |
| 2008/0007679 A1 | 1/2008 | Ochiai et al. |

FOREIGN PATENT DOCUMENTS

JP    2008-015345    1/2008

* cited by examiner

*Primary Examiner*—Jennifer Doan
(74) *Attorney, Agent, or Firm*—Antonelli, Terry, Stout & Kraus, LLP.

(57) ABSTRACT

A first conductive layer in which a first electrode film is formed, a first protective layer on the first conductive layer, a first hole penetrating through the first protective layer to reach the first electrode film, a second conductive layer including a second electrode film which is disposed on the first protective layer and in contact with a portion of the first electrode film at the bottom of the first hole and the lower electrode, a second protective layer disposed on the second conductive layer and including the insulating film, a second hole disposed on the second protective layer and penetrating through the second protective layer to reach the second electrode film, and a third conductive layer including a third electrode film which is in contact with a portion of the second electrode film at the bottom of the second hole and the upper electrode.

6 Claims, 15 Drawing Sheets

FIG. 8
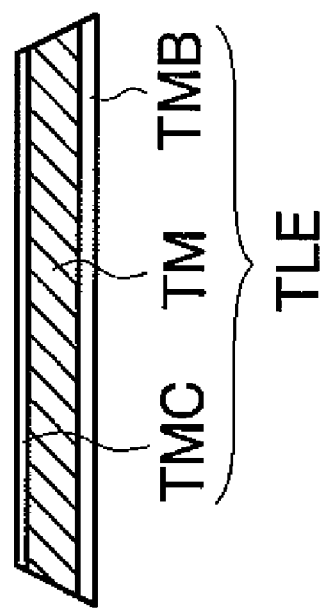
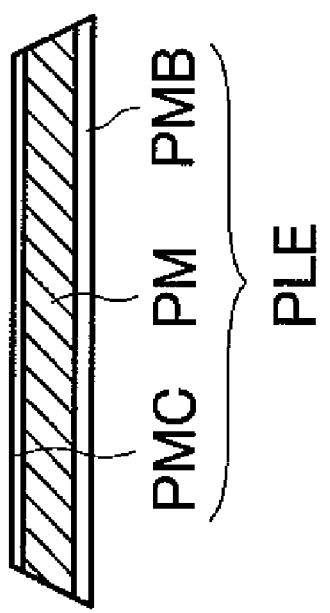

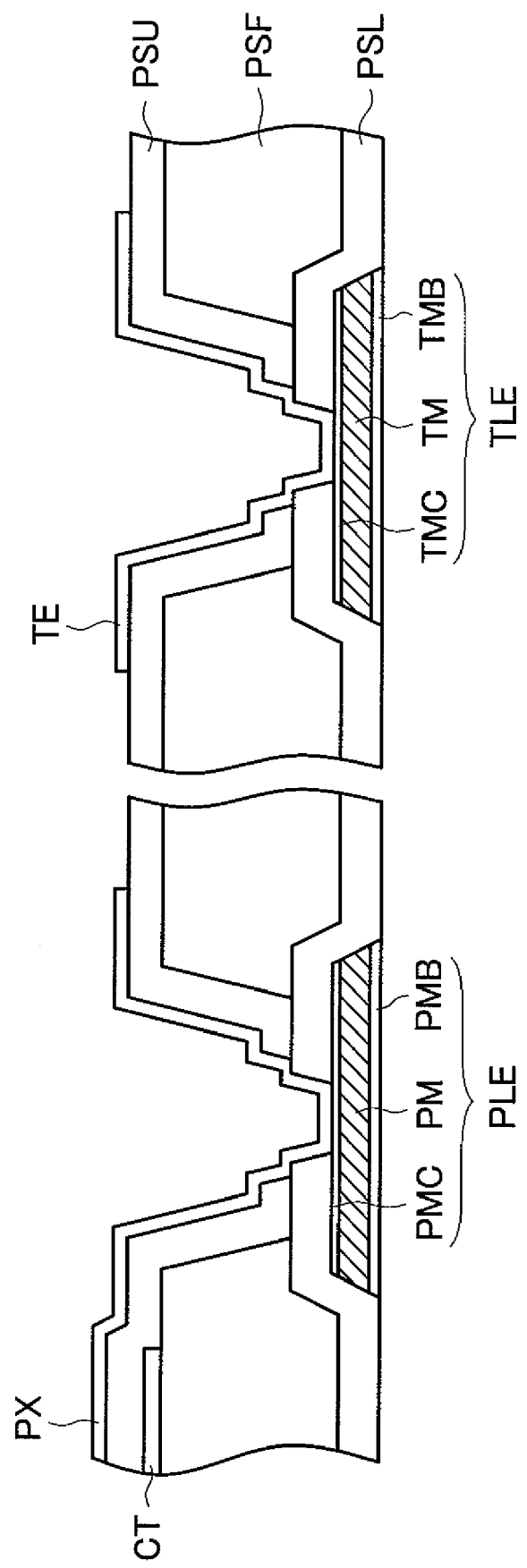

TRANSPARENT TYPE LIQUID CRYSTAL DISPLAY DEVICE

The present application claims priority from Japanese application JP2008-248955 filed on Sep. 26, 2008, the content of which is hereby incorporated by reference into this application.

BACKGROUND OF THE INVENTION

1. Field of the Invention

The present invention relates to a transparent type liquid crystal display device.

2. Background Art

For example, a transparent type liquid crystal display panel of an IPS system is configured such that liquid crystal is retained between an array substrate at which a thin film transistor and the like are formed and a filter substrate (counter substrate) which faces the array substrate and at which color filters and the like are formed. A region of the array substrate corresponding to the display region of the liquid crystal display panel (hereinafter referred to as the display region of the array substrate) exists inside an encapsulated region where the liquid crystal is retained. A terminal portion of the array substrate for connecting a driving board and a driver IC exists outside the encapsulated region without facing the filter substrate. Contact holes are formed in the display region and the terminal portion (hereinafter, the hole in the display region and the hole in the terminal portion are respectively described as a pixel contact hole and a terminal portion contact hole).

FIG. 15 is a cross sectional view of a conventional pixel contact hole and terminal portion contact hole. The cross sectional view of the pixel contact hole is shown on the left side of the drawing, and the cross sectional view of the terminal portion contact hole is shown on the right side of the drawing. A wiring electrode PLE below the pixel contact hole is composed of three layers of a cap layer PMC, a wiring metal layer PM, and a barrier layer PMB in this order from the top. A wiring electrode TLE below the terminal portion contact hole is composed of three layers of a cap layer TMC, a wiring metal layer TM, and a barrier layer TMB in this order from the top. A lower inorganic protective layer PSL is disposed on the wiring electrodes PLE and TLE. An organic protective layer PSF is formed on the lower inorganic protective layer PSL excepting the pixel contact hole and the terminal portion contact hole as viewed in a plane. An upper inorganic protective layer PSU is disposed on the organic protective layer PSF including the inner periphery portions of the pixel contact hole and the terminal portion contact hole. The pixel contact hole penetrates through the upper inorganic protective layer PSU and the lower inorganic protective layer PSL. A pixel electrode PX formed by patterning a layer of a transparent electrode is in contact with the cap layer PMC of an electrode film at the bottom of the pixel contact hole. The terminal portion contact hole also penetrates through the upper inorganic protective layer PSU and the lower inorganic protective layer PSL. A terminal protection electrode TE formed by patterning the same layer of the transparent electrode is in contact with the cap layer TMC of the electrode film at the bottom of the terminal portion contact hole. Although not shown, an inter-layer insulating film, a gate electrode film, and the like are present below the electrode film in the drawing. A common electrode CT is present between the organic protective layer PSF and the upper inorganic protective layer PSU in a region of a part of the vicinity of the pixel contact hole.

JP-A-2008-15345 is a document relating to the present application, in which a contact hole formed in a pixel circuit of a semi-transparent type liquid crystal display device is disclosed.

SUMMARY OF THE INVENTION

In the display region of the array substrate constituting a transparent type liquid crystal display device of the IPS system, since a difference in level is present at an end of the pixel electrode formed by patterning the layer of the electrode material, a difference in level is also formed in an alignment film formed on the pixel electrode. Since anchoring force generated by rubbing is weakened in the difference-in-level portion of the alignment film, a residual image sometimes appears on display. As countermeasures against the residual image, it is conceivable to reduce the thickness of the pixel electrode to about 50 nm. This reduces the difference in level, whereby a reduction in anchoring force can be suppressed. However, when the pixel electrode is thinned, an electrode film which is formed by patterning the same layer of the electrode material and covers the contact hole is also thinned. This causes a problem that pinhole defect produced in the electrode film covering the contact hole is increased.

The invention has been made in view of the above problem, and it is an object of the invention to provide a transparent type liquid crystal display device in which pinhole defect produced in an electrode film covering a contact hole is suppressed.

Typical outlines of the invention disclosed herein will be described below.

(1) A transparent type liquid crystal display device includes: a first substrate; and a second substrate facing the first substrate, wherein liquid crystal is retained between an encapsulated region of the first substrate and the second substrate, a pixel circuit disposed at the first substrate controls the alignment of the liquid crystal by an electric field generated by using an upper electrode located on an insulating film and a lower electrode located below the insulating film, and the first substrate includes a first conductive layer in which a first electrode film is formed, a first insulation protective layer disposed on the first conductive layer, a first hole penetrating through the first insulation protective layer to reach the first electrode film, a second conductive layer including a second electrode film which is disposed on the first insulation protective layer and in contact with a portion of the first electrode film at the bottom of the first hole, and the lower electrode which is disposed apart from the second electrode film, a second insulation protective layer disposed on the second conductive layer and including the insulating film, a second hole formed in a region overlapped with the first hole in a plane and penetrating through the second insulation protective layer to reach the second electrode film, and a third conductive layer including a third electrode film which is disposed on the second insulation protective layer and in contact with a portion of the second electrode film at the bottom of the second hole, and the upper electrode which is disposed apart from the third electrode film.

(2) The transparent type liquid crystal display device according to (1), wherein the first hole and the second hole are located outside the encapsulated region.

(3) The transparent type liquid crystal display device according to (2), wherein the first substrate further includes a fourth electrode film included in the first conductive layer and disposed apart from the first electrode film inside the encapsulated region, and a third hole penetrating through the first insulation protective layer to reach the fourth electrode film, the second insulation protective layer covers the third hole, and the upper electrode is in contact with the fourth electrode film inside a fourth hole penetrating through the second insulation protective layer to reach the fourth electrode film.

(4) The transparent type liquid crystal display device according to (1), wherein the third electrode film is thinner than the second electrode film, (5) The transparent type liquid crystal display device according to (1), wherein the first insulation protective layer is formed of a plurality of films which are different in material.

(6) The transparent type liquid crystal display device according to (5), wherein the first insulation protective layer includes an organic protective film.

According to the invention, the bottom of the contact hole is covered with a transparent electrode film of two layers which are in contact with each other. This can suppress pinhole defect produced in the transparent electrode film covering the contact hole.

BRIEF DESCRIPTION OF THE DRAWINGS

FIG. 8 shows a method for manufacturing the array substrate according to the embodiment;

FIG. 15 is a cross sectional view of a conventional pixel contact hole and terminal portion contact hole.

DESCRIPTION OF THE PREFERRED EMBODIMENT

Hereinafter, an embodiment of the invention will be described in detail based on the drawings.

A transparent type liquid crystal display device according to the embodiment is a transparent type liquid crystal display device of an IPS system, including an array substrate TS, a filter substrate (counter substrate) FS which faces the array substrate TS and at which color filters are disposed, a liquid crystal material encapsulated in a region interposed between the two substrates, and a driver IC attached to the array substrate TS. Both of the array substrate TS and the filter substrate FS are glass substrates or the like.

Figure 1:
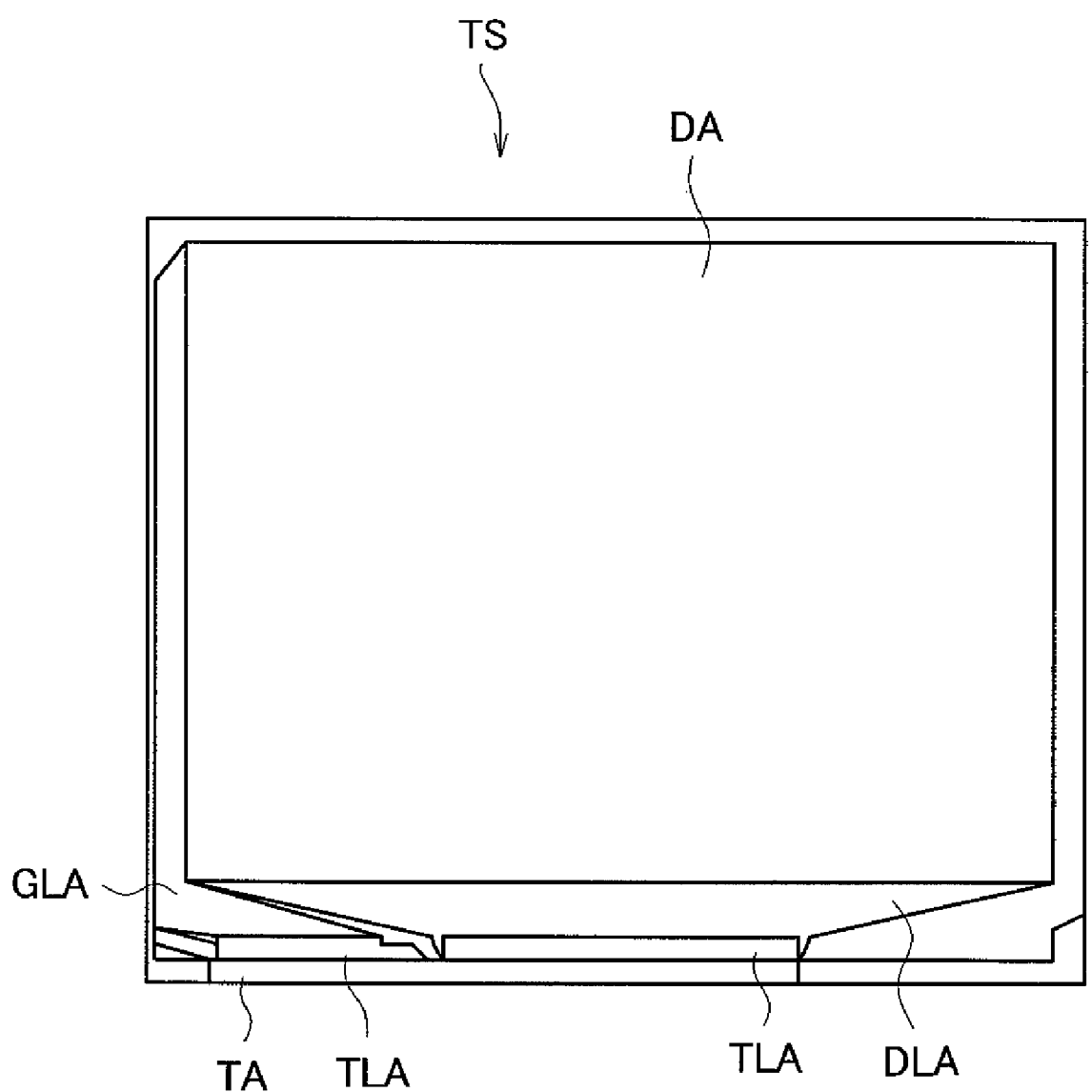
FIG. 1 is a plan view showing the layout of an array substrate according to an embodiment of the invention.

FIG. 1 is a plan view showing the layout of the array substrate TS according to the embodiment of the invention. At the array substrate TS, a display region DA in which numerous pixel circuits for displaying an image are arranged, a gate line routing region GLA which is adjacently disposed on the left side of the display region DA, a drain line routing region DLA which is adjacently disposed on the lower side of the display region DA, a terminal portion TA which is a region located at a lower edge of the array substrate TS and composed of terminals for the connection to the outside, and terminal portion periphery wiring regions TLA which are disposed between the terminal portion TA, and the gate line routing region GLA and the drain line routing region DLA are arranged.

Figure 2:
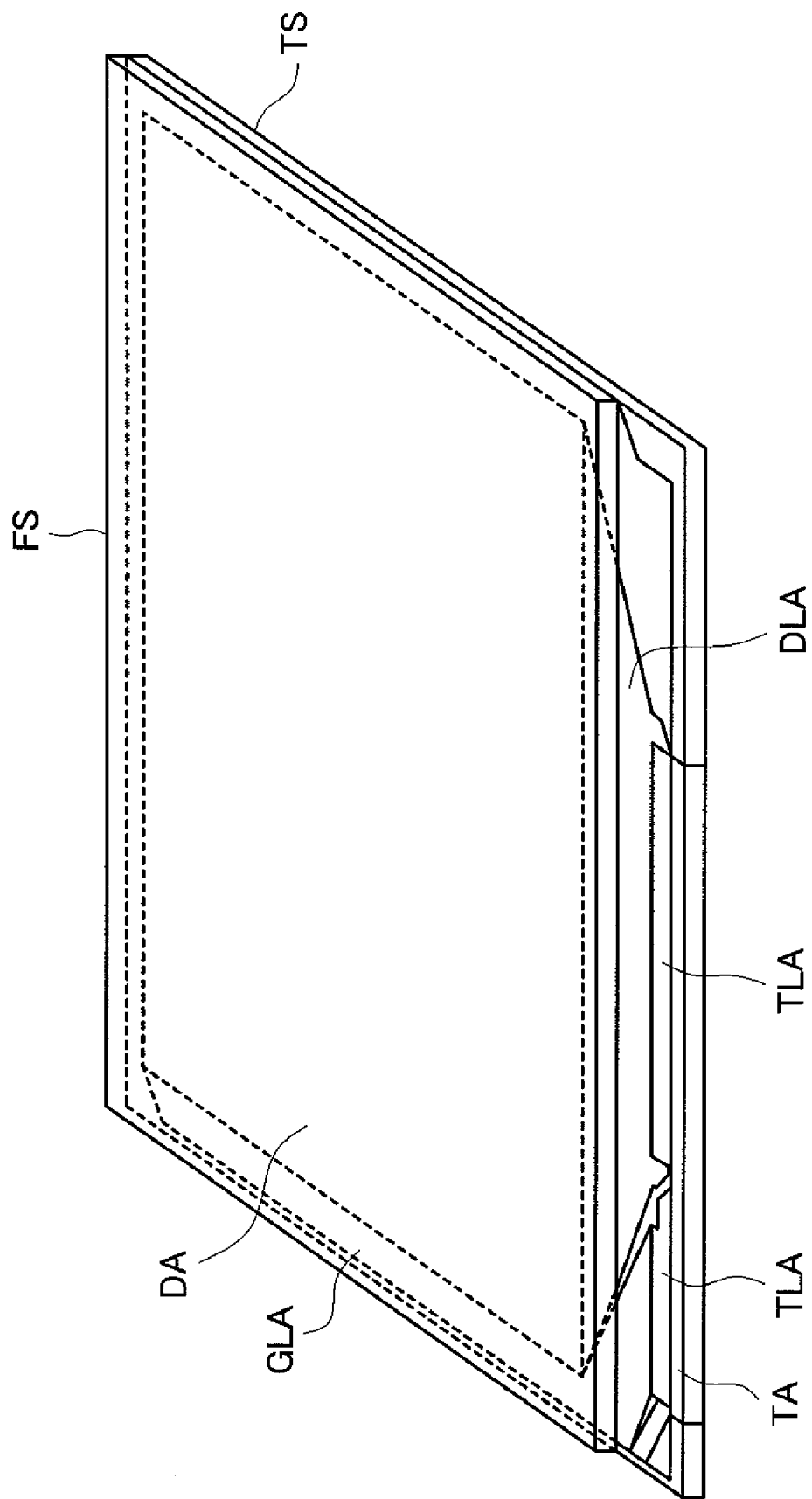
FIG. 2 shows the configuration of the array substrate and a filter substrate according to the embodiment of the invention.

FIG. 2 shows the configuration of the array substrate TS and the filter substrate FS according to the embodiment of the invention. The filter substrate FS is disposed to face the array substrate TS so as to cover the display region DA and its periphery. However, the filter substrate FS does not cover the terminal portion periphery wiring regions TLA and the terminal portion TA. The four sides of the filter substrate FS and the array substrate TS are sealed with a sealing material. A liquid crystal material is encapsulated between the array substrate TS and the filter substrate FS. The region in which the liquid crystal is encapsulated is an encapsulated region. The display region DA of the array substrate TS exists inside the encapsulated region. Wiring and terminals for the connection to the outside and for arrangement of the driver IC exist in the terminal portion periphery wiring regions TLA and the terminal portion TA which are outside the encapsulated region.

Figure 3:
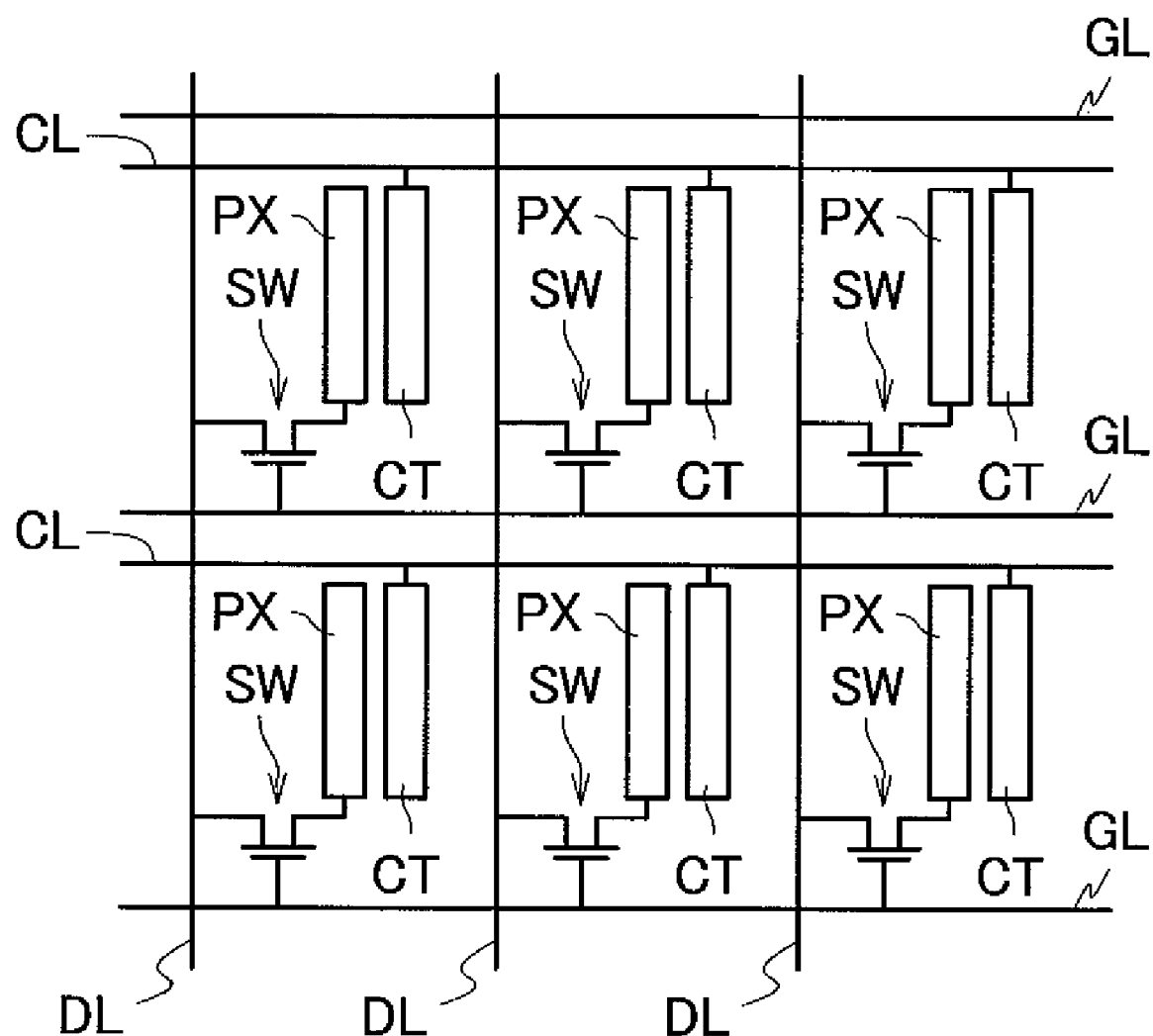
FIG. 3 shows equivalent circuits corresponding to a part of a display region.

FIG. 3 shows equivalent circuits corresponding to apart of the display region DA. In the display region DA, numerous gate signal lines GL extend in parallel with one another in the horizontal direction, and numerous video signal lines DL extend in parallel with one another in the vertical direction. The display region is partitioned in a matrix by the gate signal lines GL and the video signal lines DL, and each of the partitioned regions constitutes one pixel region. A common signal line CL extends in the horizontal direction corresponding to each of the gate signal lines GL.

A switching element SW which uses a thin film transistor having a multi-gate structure is formed at a corner of the pixel region partitioned by the gate signal lines GL and the video signal lines DL. The gate electrode of the switching element is connected to the gate signal line GL, and the drain electrode thereof is connected to the video signal line DL. A pixel electrode PX and a common electrode CT are formed in a pair in each of the pixel regions. The pixel electrode PX is connected to the source electrode of the switching element SW, and the common electrode CT is connected to the common signal line CL. The common electrode CT may also function as the common signal line CL by forming the common electrode CT itself into a planar shape or linearly without independently disposing the common signal line CL.

Figure 4:
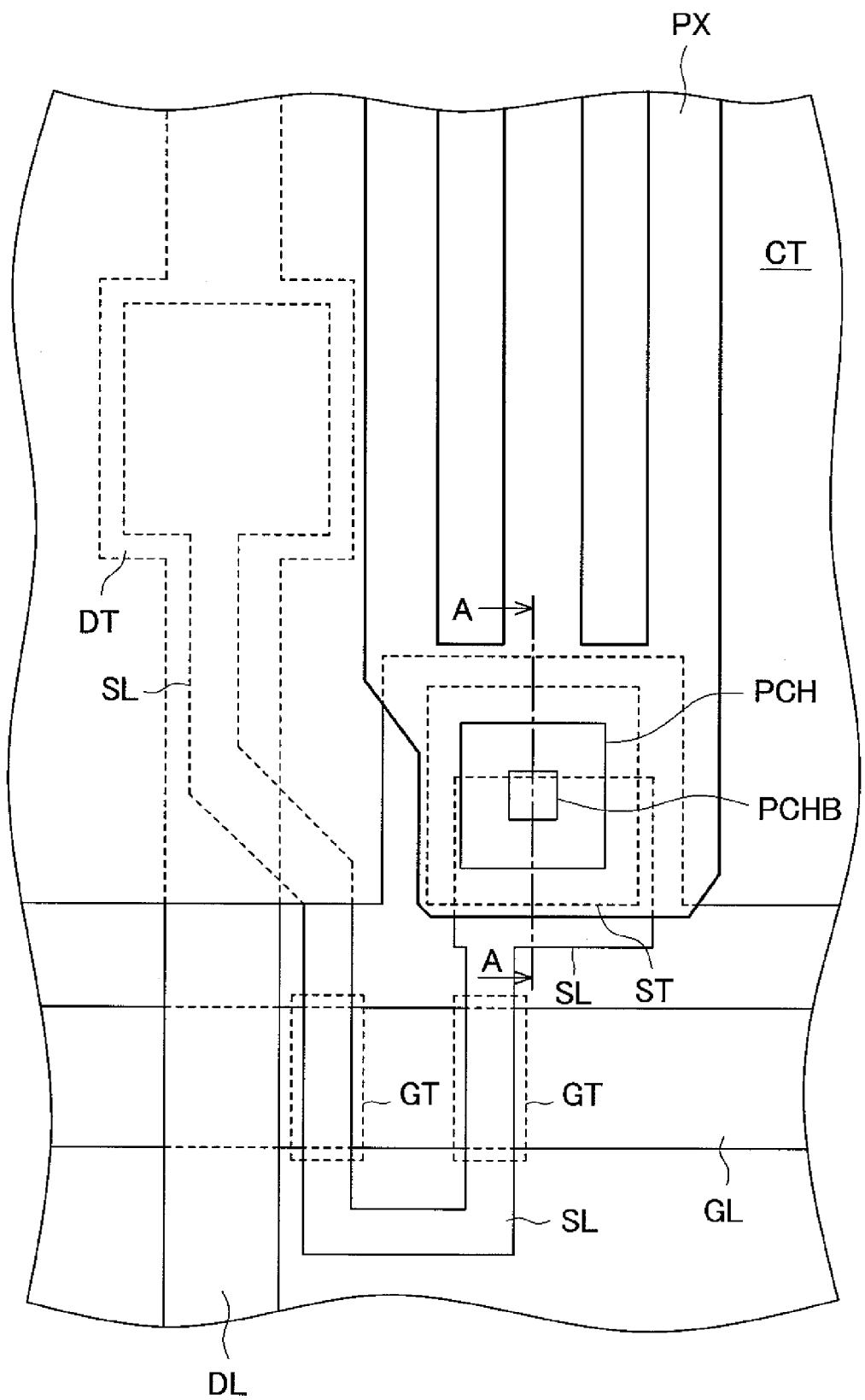
FIG. 4 is an enlarged plan view of one pixel circuit in the display region.

FIG. 4 is an enlarged plan view of one pixel circuit in the display region DA. FIG. 4 mainly shows layers having conductivity but does not show layers having insulation properties present therebetween, for facilitating the description. The gate signal line GL extends in the horizontal direction in the drawing, and the video signal line DL extends in the vertical direction in the drawing. Plural regions of gate electrodes GT constituting a transistor having a multi-gate structure are present above the gate signal line GL on the right side of a point where the gate signal line GL and the video signal line DL intersect to each other in a plane. One end of a semiconductor wiring SL including a channel portion and the like of the transistor is connected to the video signal line DL through a drain electrode DT, and the other end thereof is electrically connected to a source electrode ST in the pixel circuit. The pixel electrode PX has a comb-tooth shape in one pixel circuit and is connected to the source electrode ST (hereinafter referred to as a wiring electrode PLE) through a pixel contact hole PCH at the root portion of the pixel electrode PX. That is, the pixel electrode PX is electrically connected to the source electrode ST at a bottom PCHB of the pixel contact hole PCH. The common electrode CT below the pixel electrode PX is present in a region interposed between the gate signal lines GL adjacent to each other in a plane and disposed so as to be apart from the pixel contact hole PCH in a plane. The common signal line CL which is not shown in the drawing extends in the horizontal direction and is connected to the common electrode CT. In the drawing, an alignment film is not shown.

Figure 5:
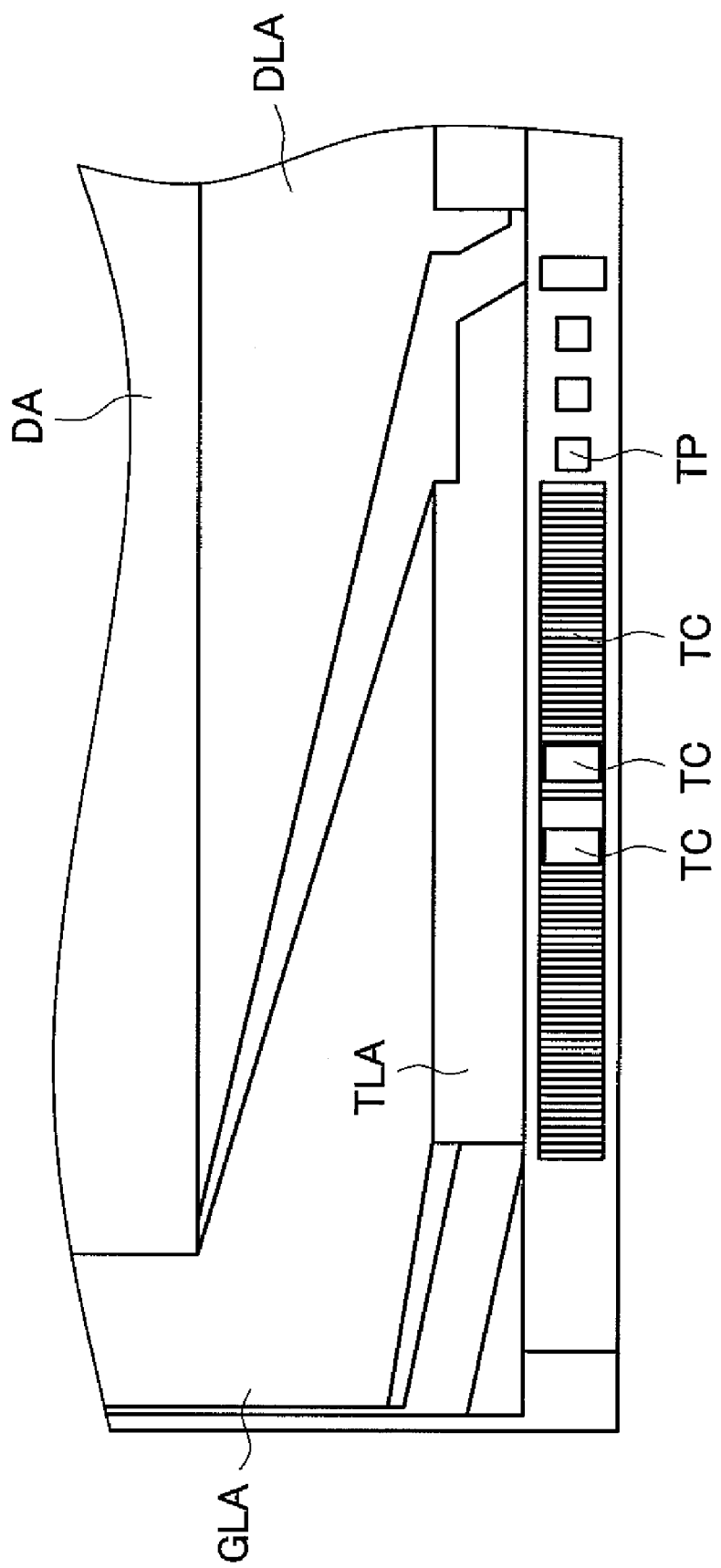
FIG. 5 is a partial plan view of the layout of the array substrate shown in FIG. 1.

FIG. 5 is a partial plan view of the layout of the array substrate TS shown in FIG. 1. FIG. 5 is an enlarged view of the lower left region in FIG. 1. Connection terminals TC and a signal pad TP for lighting test are arranged in the region of the terminal portion TA in FIG. 1, and signals from the outside are input through the connection terminals TC and the signal pad TP for lighting test.

Figure 6:
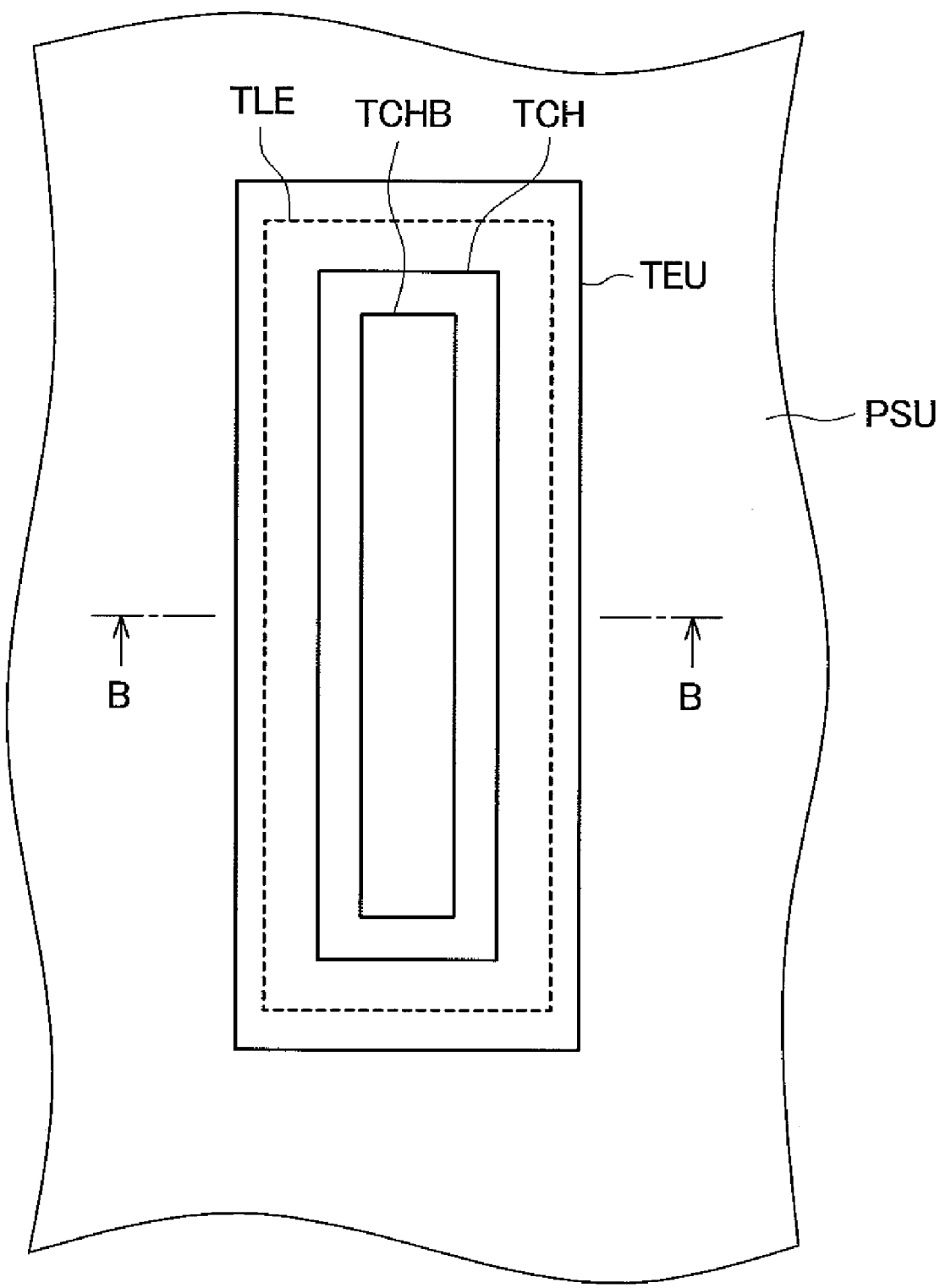
FIG. 6 is an enlarged view of one of connection terminals shown in FIG. 5.

FIG. 6 is an enlarged view of one of the connection terminals TC in FIG. 5. The connection terminal TC is a kind of contact hole and therefore hereinafter described as a terminal portion contact hole TCH. The wiring electrode TLE which is a rectangular electrode film in the same layer as the drain electrode is formed below the terminal portion contact hole TCH. An upper terminal protection electrode TEU is disposed so as to cover the wiring electrode TLE as viewed in a plane. A not-shown lower terminal protection electrode TEL having substantially the same size as the upper terminal protection electrode TEU is disposed below the upper terminal protection electrode TEU. An upper inorganic protective layer PSU is shown in a region where the upper terminal protection electrode TEU is not disposed. The upper terminal protection electrode TEU and the lower terminal protection electrode TEL are electrically connected to the wiring electrode TLE at a bottom TCHB of the terminal portion contact hole.

Figure 7:
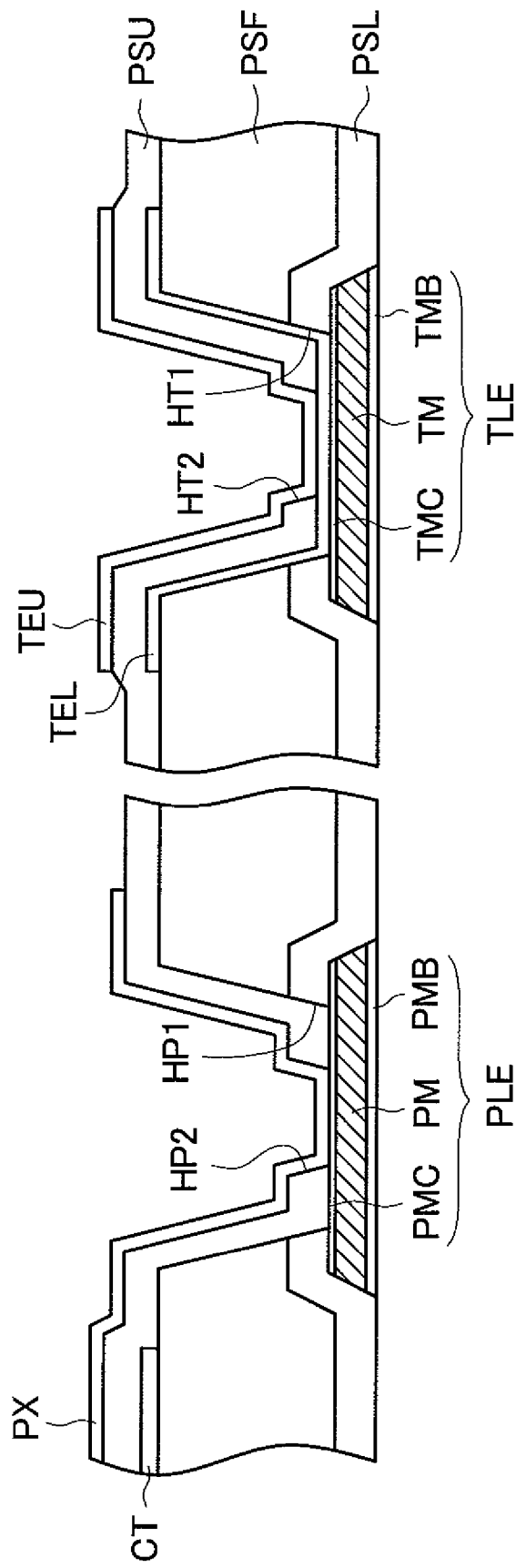
FIG. 7 is a cross sectional view taken along the line A-A of FIG. 4 and taken along the line B-B of FIG. 6.

FIG. 7 is a cross sectional view taken along the line A-A of FIG. 4 and the line B-B of FIG. 6. The left side of the drawing corresponds to the line A-A of FIG. 4, showing the pixel contact hole PCH and its periphery. The right side of the drawing corresponds to the line B-B of FIG. 6, showing the terminal portion contact hole TCH and its periphery. Both of them are formed above a not-shown glass substrate of the array substrate TS. A gate electrode layer, an inter-layer insulating film, and the like, which are not shown, are present between the glass substrate, and the wiring electrodes PLE and TLE and the lower inorganic protective layer PSL. First, these not-shown structures will be described. The gate electrode layer in which the gate signal lines GL and the like are formed and a layer of the first inter-layer insulating film disposed on the gate electrode layer are present on the glass substrate. A not-shown semiconductor layer in which the channel of a transistor and the like are formed is present on the layer of the first inter-layer insulating film. A layer of a not-shown second inter-layer insulating film is present on the semiconductor layer. The electrode material of the gate electrode layer is, for example, a metal material such as an aluminum alloy, and the material of the semiconductor layer is, for example, amorphous silicon or polycrystal silicon. The materials of the fist and second inter-layer insulating films are, for example, silicon nitride or silicon oxide.

The structure shown in FIG. 7 will be described below. The wiring electrode PLE and the wiring electrode TLE are formed on the not-shown second inter-layer insulating film. The wiring electrode PLE is composed of three layers of a barrier layer PMB, a wiring metal layer PM, and a cap layer PMC formed in this order from the bottom. The wiring electrode TLE is disposed apart from the wiring electrode PLE in a plane and composed of three layers of a barrier layer TMB, a wiring metal layer TM, and a cap layer TMC formed in this order from the bottom. The wiring metal layers PM and TM are formed of, for example, AlSi. The barrier layers PMB and TMB and the cap layers PMC and TMC are formed of, for example, MoW. The layer in which the electrode films of the wiring electrodes PLE and TLE are formed is hereinafter referred to as a first conductive layer. A lower inorganic protective layer PSL and an organic protective layer PSF are sequentially disposed on the wiring electrodes PLE and TLE and the region of the second inter-layer insulating film not formed with the wiring electrodes, that is, on the first conductive layer. The lower inorganic protective layer PSL is formed of, for example, an insulating material such as silicon nitride. The organic protective layer PSF is formed of, for example, an insulating material such as a photosensitive organic resin film. A large hole HP1 which penetrates through the lower inorganic protective layer PSL and the organic protective layer PSF to reach the wiring electrode PLE is formed below the pixel contact hole PCH. A large hole HT1 which penetrates through the lower inorganic protective layer PSL and the organic protective layer PSF to reach the wiring electrode TLE is formed below the terminal portion contact hole TCH. The lower terminal protection electrode TEL is formed so as to cover the bottom, inner periphery surface, and periphery of the large hole HT1 on the terminal portion contact hole TCH side, and is in contact with the wiring electrode TLE at the bottom of the large hole HT1. The common electrode CT is formed apart from the large hole HP1 on the organic protective layer PSF at the periphery of the pixel contact hole PCH on the left side of the drawing. The layer in which the lower terminal protection electrode TEL and the common electrode CT are formed is hereinafter referred to as a second conductive layer.

The upper inorganic protective layer PSU is disposed on the second conductive layer. The upper inorganic protective layer PSU covers not only the second conductive layer but also the organic protective layer PSF and the inner parts of the large holes HP1 and HT1 in regions where the second conductive layer is not formed. The upper inorganic protective layer PSU is formed of, for example, an insulating material such as silicon nitride. A small hole HP2 which penetrates through a part of the upper inorganic protective layer PSU on the large hole HP1 on the pixel contact hole PCH side to reach the wiring electrode PLE is formed. A small hole HP2 which penetrates through a part of the upper inorganic protective layer PSU above the large hole HT1 on the terminal portion contact hole TCH side to reach the lower terminal protection electrode TEL is formed. In this case, the upper inorganic protective layer PSU covering the large hole HP1 and the small hole HP2 constitute the pixel contact hole PCH. The upper inorganic protective layer PSU covering the large hole HT1 and the small hole HT2 constitute the terminal portion contact hole TCH. The pixel electrode PX is formed so as to cover the bottom, inner periphery surface, and periphery of the small hole HP2 on the pixel contact hole PCH side, and is in contact with the wiring electrode PLE at the bottom of the small hole HP2. The upper terminal protection electrode TEU is formed so as to cover the inner part and periphery of the small hole HT2 on the terminal portion contact hole TCH side, and is in contact with the lower terminal protection electrode TEL at the bottom of the small hole HT2. The pixel electrode PX is formed so as to reach a portion above the common electrode CT. The pixel electrode PX is located on the upper inorganic protective layer PSU, while the common electrode CT is located below the upper inorganic protective layer PSU. The pixel electrode PX has a comb-tooth shape in a plane, while the common electrode CT has a planar shape. Voltage is applied to these two electrodes when performing liquid crystal display. With the application, an electric field is generated by the potential difference between the pixel electrode PX and the common electrode CT, whereby a lateral electric field can be applied to the liquid crystal located above the pixel electrode PX. The thickness of the pixel electrode PX can be less than that of the common electrode CT. The thickness of the pixel electrode PX is reduced to 50 nm or less to reduce a difference in level for countermeasures against a residual image. In the case of the common electrode CT, on the other hand, the upper inorganic protective layer PSU is present on the common electrode CT, whereby the possibility of the occurrence of a problem due to a difference in level is lower compared with the pixel electrode PX.

Since the terminal portion contact hole TCH is configured as described above, a portion of the bottom of the terminal portion contact hole in contact with the wiring electrode TLE is covered with a region where two layers of the lower terminal protection electrode TEL and the upper terminal protection electrode TEU are overlapped with each other. Therefore, it is possible to suppress pinhole defect of the electrode film such as a transparent conductive film made of, for example, ITO, which constitutes these electrodes. Accordingly, it is also possible to suppress the intrusion of liquid or the like into the wiring electrode TLE present below the terminal portion contact hole. A specific example will be described. In manufacturing a liquid crystal display panel, after an alignment film is formed at the array substrate shown in FIG. 7 and subjected to a rubbing treatment, shavings of the material of the alignment film sometimes remain in the terminal portion contact hole. When alkali cleaning is applied to remove the shavings, it is possible to suppress a phenomenon that the intrusion of the cleaner due to the pinhole defect causes a battery reaction or the like to melt the wiring electrode TLE. Therefore, yield in the manufacturing process can be improved. Since the above alkali cleaning is applied to the terminal portion contact hole after bonding the array substrate TS and the filter substrate FS together, alkali cleaning is not applied to the pixel contact hole. Accordingly, even when the pixel contact hole is configured to be electrically connected to the wiring electrode PLE only through one thin layer of the pixel electrode PX, there arises no problem.

Hereinafter, a method for manufacturing the array substrate having the configuration as described above will be described. FIGS. 8 to 14 show steps of manufacturing the array substrate TS according to the embodiment. A cross sectional view of a region where the pixel contact hole PCH above the display region DA is formed is shown on the left side of the drawing, while a cross sectional view of a region where the terminal portion contact hole TCH is formed is shown on the right side of the drawing. First, a metal material is deposited on a glass substrate serving as the array substrate TS to form a layer of the gate signal lines GL and the like by photolithography. For example, silicon nitride is next deposited to form a layer of the first inter-layer insulating film. Then, a semiconductor layer including a material such as amorphous silicon or polysilicon is deposited and thereafter patterned by photolithography. Next, a layer of the second inter-layer insulating film is formed of, for example, silicon nitride. Then, metals are deposited in the order of MoW, AlSi, and MoW above the array substrate TS formed with the layer of the second inter-layer insulating film to form, by photolithography, the first conductive layer including the wiring electrode PLE composed of the barrier layer PMB, the wiring metal layer PM, and the cap layer PMC, and the wiring electrode TLE composed of the barrier layer TMB, the wiring metal layer TM, and the cap layer TMC. FIG. 8 shows the array substrate at this stage. In FIGS. 8 to 14, the layers of and below the second inter-layer insulating film are not shown.

Figure 9:
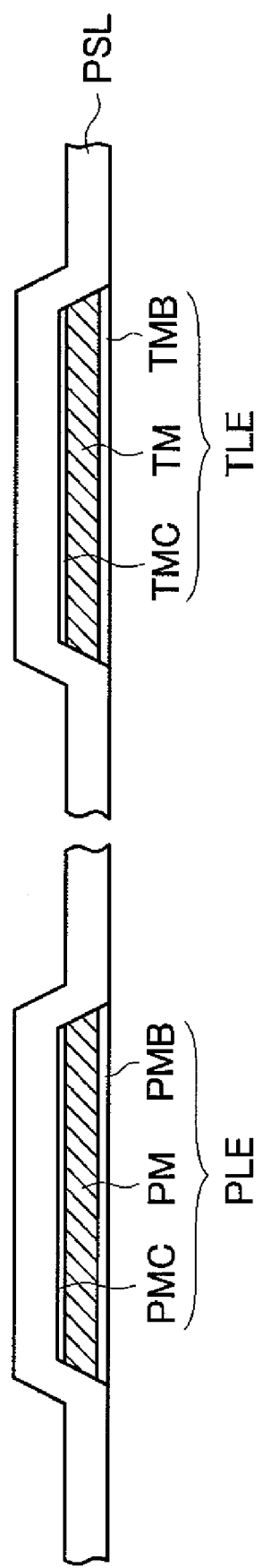
FIG. 9 shows the method for manufacturing the array substrate according to the embodiment.
Figure 10:
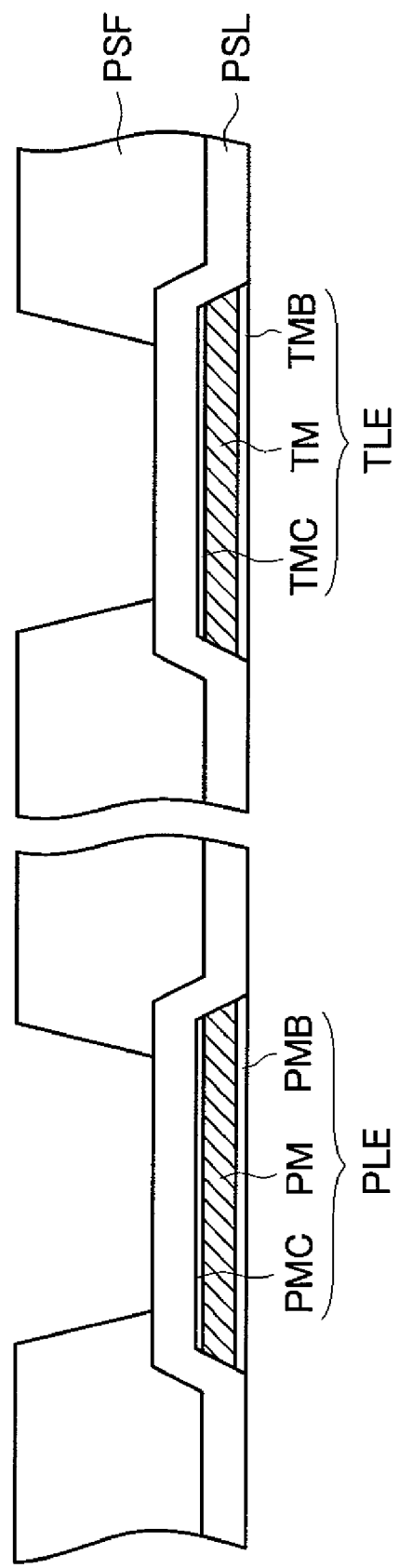
FIG. 10 shows the method for manufacturing the array substrate according to the embodiment.

Next, silicon nitride is deposited above the array substrate TS in the state shown in FIG. 8 to form the lower inorganic protective layer PSL. FIG. 9 shows the array substrate in this state. A photosensitive organic resin film and the like are applied above the array substrate TS, exposed and developed, and thereafter subjected to annealing. With this step, the organic protective layer PSF is formed. Here, the exposure is performed so as to form openings of the organic protective layer PSF respectively above the wiring electrodes PLE and TLE. FIG. 10 shows the state of the array substrate TS at this stage.

Figure 11:
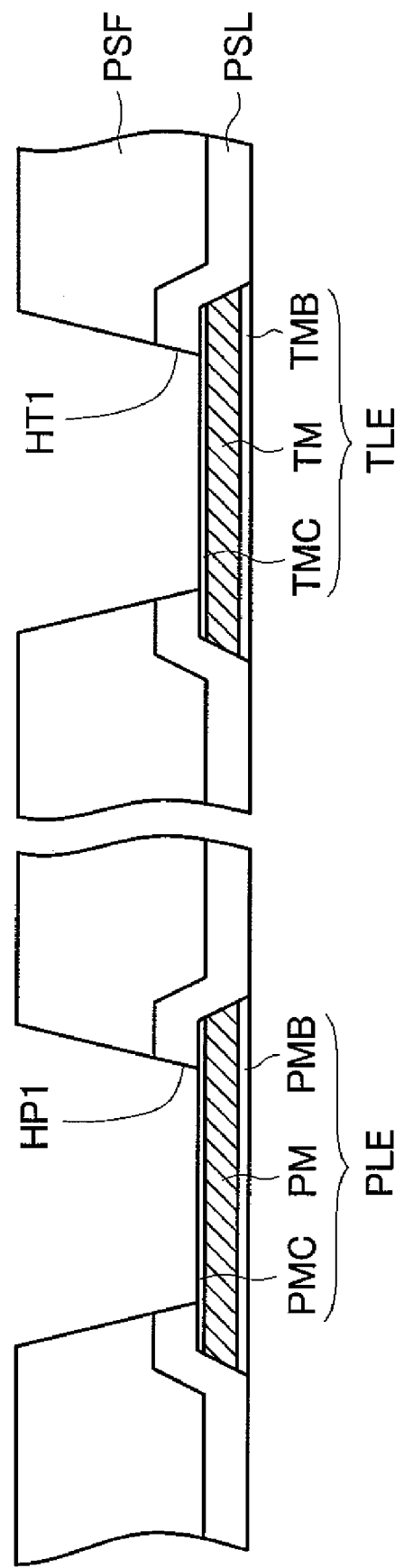
FIG. 11 shows the method for manufacturing the array substrate according to the embodiment.

Next, the lower inorganic protective layer PSL is etched to the wiring electrodes PLE and TLE using the organic protective layer PSF as a mask to complete the large holes HP1 and HT1. As the etching technique, a method which uses a fluorocarbon type gas and by which an etched portion is formed into a tapered shape is used. FIG. 11 shows the state of the array substrate TS at this stage. Since the openings have to be formed by photolithography upon forming the organic protective layer PSF, the number of times of photolithography does not change irrespective of whether etching is performed or not using the organic protective layer PSF as a mask.

Figure 12:
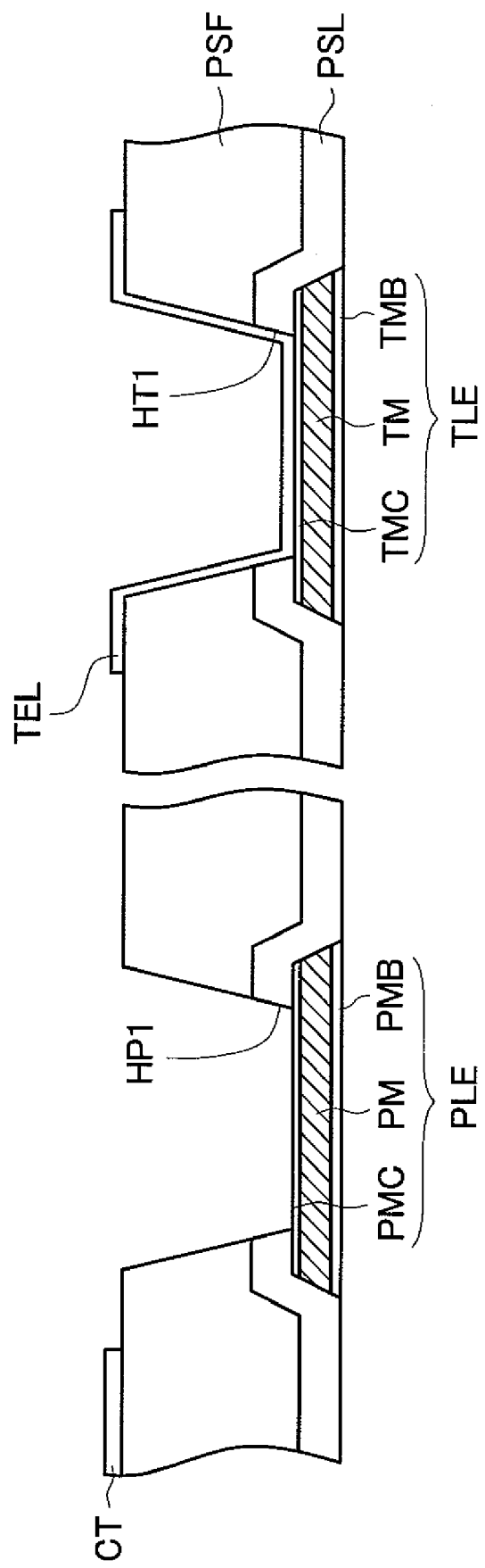
FIG. 12 shows the method for manufacturing the array substrate according to the embodiment.

A conductive film is formed of a material of a transparent electrode, such as, for example, indium tin oxide (ITO) over the array substrate TS in the state shown in FIG. 11 and patterned by photolithography. With this step, the lower terminal protection electrode TEL and the common electrode CT are formed. FIG. 12 shows the state of the array substrate at this stage. A conductive film of this layer is not formed for the pixel contact hole. This is because if the conductive film is formed on the large hole HP1 on the left side of the drawing, the conductive film has to cover the periphery of the large hole HP1 for reliably removing a resist film. In this case, the area of the common electrode CT has to be reduced for ensuring insulation between the conductive film and the common electrode CT. The reduction in area of the common electrode CT leads to a reduction in aperture ratio.

Figure 13:
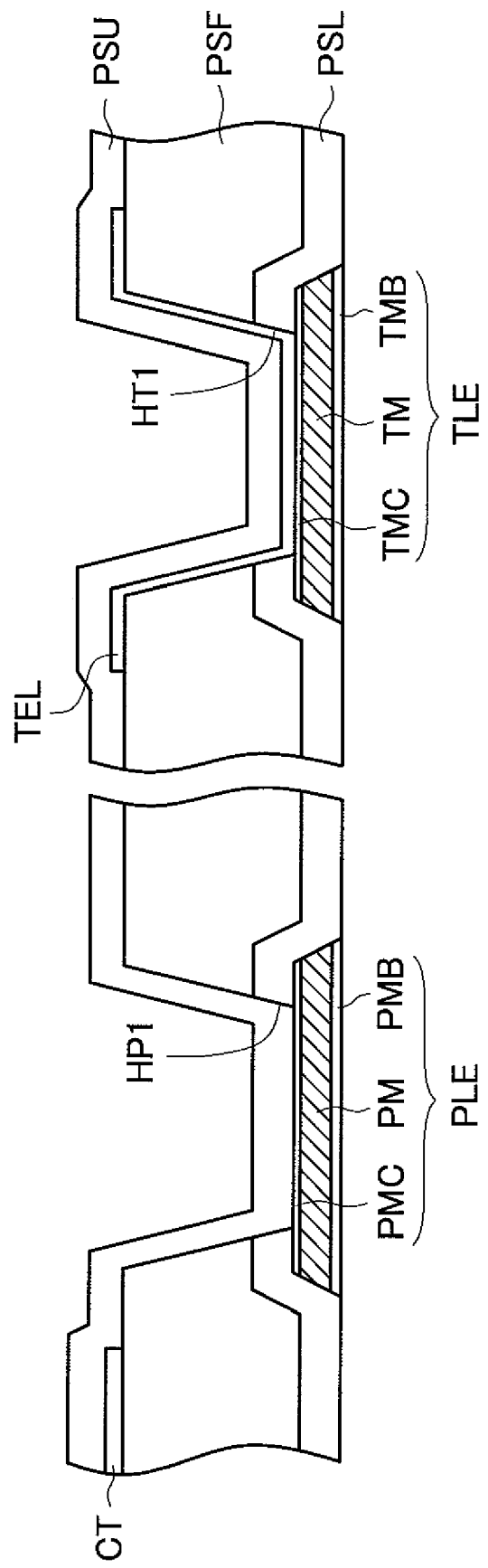
FIG. 13 shows the method for manufacturing the array substrate according to the embodiment.
Figure 14:
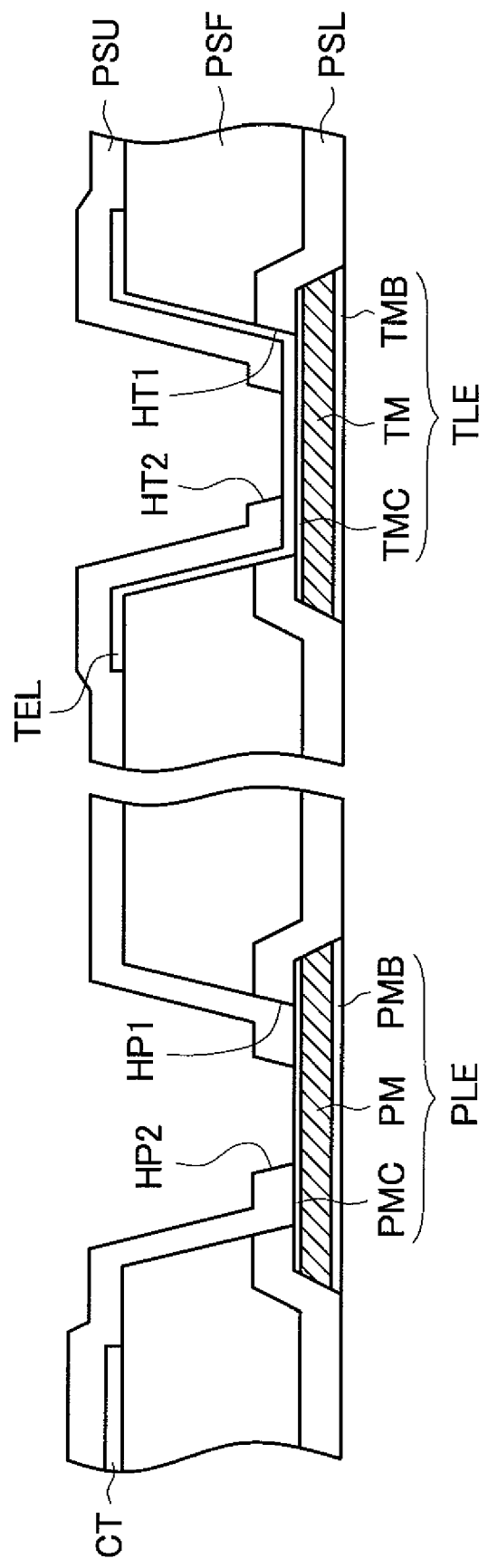
FIG. 14 shows the method for manufacturing the array substrate according to the embodiment.

Silicon nitride is deposited over the array substrate TS in the state shown in FIG. 12 to form the upper inorganic protective layer PSU. FIG. 13 shows the array substrate at this stage. Next, a resist film having an opening at a region where the large hole HP1 or the large hole HT1 is overlapped thereon is formed on the upper inorganic protective layer PSU, and etching is performed. FIG. 14 shows the array substrate TS at this stage. With this step, the small hole HP2 and the small hole HT2 are formed in the region where the pixel contact hole PCH is formed and the region where the terminal portion contact hole TCH is formed, respectively. A conductive film is further formed of a material of a transparent electrode and patterned by photolithography, thereby forming the upper terminal protection electrode TEU and the pixel electrode PX. At this stage, the array substrate TS is in the state shown in FIG. 7. Further, steps of forming an alignment film above the array substrate TS, performing rubbing treatment, and bonding the array substrate TS and the filter substrate FS together are carried out, thereby completing a liquid crystal display device.

Although the embodiment of the invention has been described so far, the invention is not limited to the above embodiment. For example, the common electrode CT may be present on the upper inorganic protective layer PSU, and the pixel electrode PX may be located below the upper inorganic protective layer PSU. This is because a lateral electric field for an IPS system can be generated even in that state. In this case, the common electrode CT is formed in a comb-tooth shape, while the pixel electrode PX is formed in a planar shape. The thickness of the common electrode CT located on the upper inorganic protective layer is reduced to 50 nm or less as countermeasures against a residual image. The pixel electrode located below the upper inorganic protective layer is electrically connected to the wiring electrode PLE at the pixel contact hole. Also in this case, however, the terminal portion contact hole is configured in substantially the same manner as in the embodiment described so far. The switching element SW of the pixel circuit is not limited to one having a bottom gate structure but may be one having a top gate structure.

What is claimed is:

1. A transparent type liquid crystal display device comprising:
    a first substrate; and
    a second substrate facing the first substrate, wherein
    liquid crystal is retained between an encapsulated region of the first substrate and the second substrate,
    a pixel circuit disposed at the first substrate controls the alignment of the liquid crystal by an electric field generated by using an upper electrode located on an insulating film and a lower electrode located below the insulating film, and
    the first substrate includes
        a first conductive layer in which a first electrode film is formed,
        a first insulation protective layer disposed on the first conductive layer,
        a first hole penetrating through the first insulation protective layer to reach the first electrode film,
        a second conductive layer including a second electrode film which is disposed on the first insulation protective layer and in contact with a portion of the first electrode film at the bottom of the first hole, and the lower electrode which is disposed apart from the second electrode film,
        a second insulation protective layer disposed on the second conductive layer and including the insulating film,
        a second hole formed in a region overlapped with the first hole in a plane and penetrating through the second insulation protective layer to reach the second electrode film, and
        a third conductive layer including a third electrode film which is disposed on the second insulation protective layer and in contact with a portion of the second electrode film at the bottom of the second hole, and the upper electrode which is disposed apart from the third electrode film.

2. The transparent type liquid crystal display device according to claim 1, wherein
    the first hole and the second hole are located outside the encapsulated region.

3. The transparent type liquid crystal display device according to claim 2, wherein
    the first substrate further includes
        a fourth electrode film included in the first conductive layer and disposed apart from the first electrode film inside the encapsulated region, and
        a third hole penetrating through the first insulation protective layer to reach the fourth electrode film,
    the second insulation protective layer covers the third hole, and
    the upper electrode is in contact with the fourth electrode film inside a fourth hole penetrating through the second insulation protective layer to reach the fourth electrode film.

4. The transparent type liquid crystal display device according to claim 1, wherein
    the third electrode film is thinner than the second electrode film.

5. The transparent type liquid crystal display device according to claim 1, wherein
    the first insulation protective layer is formed of a plurality of films which are different in material.

6. The transparent type liquid crystal display device according to claim 5, wherein
    the first insulation protective layer includes an organic protective film.

* * * * *